US006771204B2

(12) United States Patent
Hayashi et al.

(10) Patent No.: US 6,771,204 B2
(45) Date of Patent: Aug. 3, 2004

(54) RADIO WAVE ABSORBER

(75) Inventors: Toshikatsu Hayashi, Kumagaya (JP); Akira Kunimoto, Kumagaya (JP)

(73) Assignees: Kabushiki Kaisha Riken, Tokyo (JP); JSP Corporation, Tokyo (JP)

( * ) Notice: Subject to any disclaimer, the term of this patent is extended or adjusted under 35 U.S.C. 154(b) by 0 days.

(21) Appl. No.: 10/352,065

(22) Filed: Jan. 28, 2003

(65) Prior Publication Data

US 2003/0146866 A1 Aug. 7, 2003

(30) Foreign Application Priority Data

Jan. 31, 2002 (JP) ....................................... 2002-024381

(51) Int. Cl.[7] ................................................ G01Q 17/00
(52) U.S. Cl. ................................................ 342/1; 342/4
(58) Field of Search ................................ 342/1, 2, 3, 4; 181/286, 294, 295

(56) References Cited

U.S. PATENT DOCUMENTS

| | | | | | |
|---|---|---|---|---|---|
| 2,977,591 | A | * | 3/1961 | Tanner | 342/1 |
| 3,568,196 | A | * | 3/1971 | Bayrd et al. | 342/4 |
| 3,596,270 | A | * | 7/1971 | Fukui | 342/1 |
| 3,836,967 | A | * | 9/1974 | Wright | 342/4 |
| 4,023,174 | A | * | 5/1977 | Wright | 342/4 |
| 4,050,073 | A | * | 9/1977 | Wesch | 342/4 |
| 4,164,718 | A | * | 8/1979 | Iwasaki | 333/81 R |
| 4,496,950 | A | * | 1/1985 | Hemming et al. | 342/4 |
| 4,942,402 | A | * | 7/1990 | Prewer et al. | 342/1 |
| 5,208,599 | A | * | 5/1993 | Rudduck et al. | 342/4 |
| 5,396,249 | A | * | 3/1995 | Yamada et al. | 342/1 |
| 5,617,095 | A | * | 4/1997 | Kim et al. | 342/1 |
| 5,710,564 | A | * | 1/1998 | Nimtz et al. | 342/1 |
| 5,844,518 | A | * | 12/1998 | Berg et al. | 342/2 |
| 5,885,692 | A | * | 3/1999 | Imashiro et al. | 428/159 |
| 5,892,188 | A | | 4/1999 | Hayashi et al. | 181/295 |
| 6,007,905 | A | * | 12/1999 | Kudo et al. | 428/313.5 |
| 6,043,769 | A | * | 3/2000 | Rowe et al. | 342/4 |
| 6,061,011 | A | * | 5/2000 | Yamamoto et al. | 342/1 |
| 6,245,434 | B1 | * | 6/2001 | Shinozaki et al. | 428/472 |
| 6,373,425 | B1 | | 4/2002 | Inoue et al. | 342/1 |
| 6,407,693 | B1 | * | 6/2002 | Murase et al. | 342/4 |

FOREIGN PATENT DOCUMENTS

EP 0 821 432 A2 1/1995

* cited by examiner

*Primary Examiner*—Thomas H. Tarcza
*Assistant Examiner*—Brian K Andrea

(57) ABSTRACT

A radio wave absorber unit includes two or more molded bodies in a pyramid or wedge shape whose radius at the tip end is from 0.5 mm to 7.5 mm and a base. A radius at the trough between adjacent molded bodies is 7.5 mm or less. A unit including molded bodies and the base is integrally formed from propylene-based conductive expanded beads. The bases of adjacent units are connected by fitting their recessed and raised portions to each other. The expanded bead size is in the range from 2 mm to 10 mm, and beads with two or more different bead diameters can be used. A hollow molded body can be formed by providing a hollow structure inside.

10 Claims, 8 Drawing Sheets

AMPLIFIER : ELENA EA1000-200SS
SIGNAL GENERATOR : HP8657A
FIELD MONITOR : AR FM5004
GTEM-CELL : ELENA EGT-500B

RADIO WAVE ABSORBER

BACKGROUND OF THE INVENTION

1. Field of the Invention

The present invention generally relates to a radio wave absorber, and more particularly, to the structure (geometry) of an absorber unit for use in an anechoic chamber.

2. Description of the Related Art

It is known to use an anechoic chamber for measuring noises in relation with EMC (Electromagnetic Compatibility), or evaluating an antenna. The anechoic chamber has an outer shield wall to block incoming noises, or the leakage of radiated radio waves to the outer side, while there is a radio wave absorber attached inside in order to prevent electric waves from reflecting. Radio wave absorbers of various materials and in various shapes are commercially available. Among them, a radio wave absorber made of a molded body in a pyramid shape or a wedge shape is known and widely used to provide high wave absorbing performance. Hereinafter, the term "pyramid shape" will also include "wedge shape" unless otherwise stated. The description therefore also applies to the "wedge shape".

These radio wave absorbers are formed in a pyramid shape so that the density gradient relative to an incoming wave is geometrically formed. This allows for impedance matching and band broadening. Meanwhile, a scattering effect resulting from the geometry at high frequencies further improves the radio wave absorption characteristic. In order to further improve the radio wave absorption characteristic, the pyramid shape needs to be more acutely angled.

According to a known method of manufacturing a radio wave absorber of a pyramid shaped molded body, a urethane absorber is produced by machining a block shaped molded body of a urethane foam impregnated with carbon. The resulting pyramid shaped body with an angular tip end obtained by shearing is prone to chipping. The productivity is therefore low and the shapes can be broken during the transport. This disadvantage is more distinct when the angles of the tip end of the pyramid shape is reduced so as to improve the scattering effect.

There is a widely known method of integrally forming a pyramid shaped molded body and a base by in-mold foaming using polystyrene expanded beads. This method, however, only provides a pyramid with an obtuse tip or a cut tip of large size, which degrades the radio wave absorption characteristic.

SUMMARY OF THE INVENTION

It is an object of the invention to provide a radio wave absorber having a good radio wave absorption characteristic, and high impact resistance, so that the absorber is free from damages by chipping or the like. Another object of the invention is to provide a radio wave absorber with high production yield that has both a good radio wave absorption characteristic and high impact resistance.

The above first object of the invention is achieved by a radio wave absorber including a pyramid or wedge shaped molded body whose radius 'R' at the tip end is in the range from 0.5 mm to 7.5 mm. More specifically, the tip end of the pyramid shape for example is formed to have a curved surface so that the tip end radius 'R' is in the range from 0.5 mm to 7.5 mm. Here problems of chipping at the tip end or the like can be significantly improved while a good radio wave absorption characteristic is maintained.

The above second object of the invention is achieved by a radio wave absorber unit including at least two pyramid or wedge shaped molded bodies, and a base supporting the molded bodies. The radio wave absorber unit is integrally formed of a polypropylene-based conductive expanded bead, with the length of one side of the tip end of the pyramid or wedge shaped molded body being 15 mm or less. Here, when the tip end has a curved surface, the length of one side refers to the length of one side of a plane obtained by removing the curved portion.

Using the polypropylene-based conductive expanded beads as a substrate material, a radio wave absorber unit having a complex shape according to the invention can be integrally formed with high production efficiency. Polypropylene is flexible and resilient, and therefore the resultant radio wave absorber has high impact resistance, and a good radio wave absorption characteristic results when the length of one side of the tip end of the pyramid shape in the radio wave absorber is 15 mm or less.

DETAILED DESCRIPTION OF THE PREFERRED EMBODIMENTS

Figure 1:
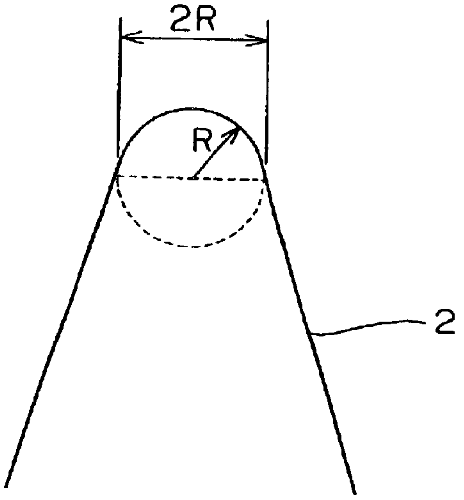
FIG. 1 is a diagram for use in illustration of how a radius ('R' value) at a tip end or trough is calculated.
Figure 2A:
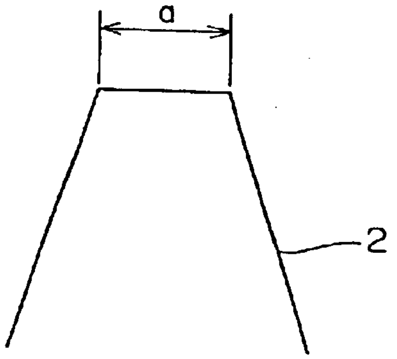
FIG. 2 is a diagram for use in illustration of how the length of one side at a tip end or trough is calculated.
Figure 2B:
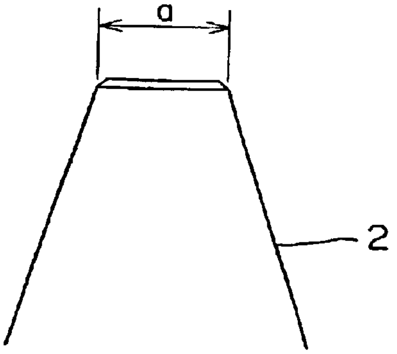
Figure 2C:
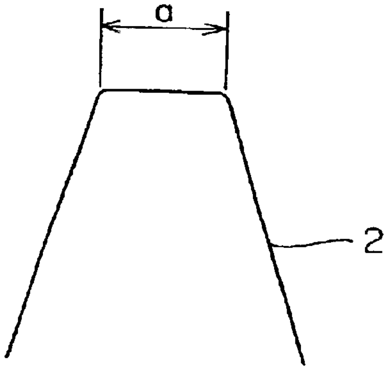
Figure 2D:
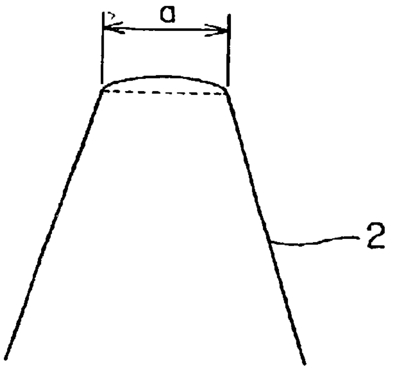

According to the invention, the radius 'R' at the tip end of a radio wave absorber 1 made from a pyramid or wedge shaped molded body 2 is from 0.5 mm to 7.5 mm. Herein, 'R' at the tip end (also referred to as "tip end R") refers to the radius 'R' (r1) at the tip end of the pyramid shaped molded body 2 shown in FIG. 3 or the wedge shaped molded body 2 shown in FIG. 5, and the radius of the circle in contact with the tip end as shown in FIG. 1.

When the pyramid shape in the radio wave absorber has a curved tip end whose 'R' is in the range from 0.5 mm to 7.5 mm, chipping or the like at the tip end can be significantly reduced while retaining a good radio wave absorption characteristic. The tip end R (r1) is preferably in the range from 2 mm to 5 mm. When the tip end R is less than 0.5 mm, chipping can occur, while, when the tip end R is more than 7.5 mm, the radio wave absorption characteristic is degraded.

In a radio wave absorber unit having two or more pyramid or wedge shaped molded bodies 2, and a base 3 supporting them, 'R' at the trough between adjacent pyramid or wedge shaped molded bodies 2 is desirably 7.5 mm or less. Herein, 'R' at the trough (also referred to as "trough R") refers to the radius 'R' (r2) at the trough portion between the pyramid shaped molded bodies in FIG. 3, or the wedge shaped molded bodies in FIG. 5, i.e., the radius of a circle in contact with the tip end of the trough.

The trough R (r2) between the pyramid shaped molded bodies is 7.5 mm or less so that an improved scattering effect, and a better radio wave absorption characteristic, can be attained. Herein, the trough R (r2) is preferably 5 mm or less, and more preferably 4 mm or less. The lower limit need not be specified. However, in the radio wave absorber unit made of a polypropylene-based conductive expanded material that will be described later, the trough R is desirably at least 1 mm for convenience of manufacturing.

In addition, the apex angle at the pyramid, and the trough angle between adjacent pyramids (θ in FIG. 4 or 5), are each an acute angle of 25° or smaller so that a further improved scattering effect and a better radio wave absorption characteristic can be achieved. These angles are desirably not less than 15° in view of the strength of the molded bodies and the production efficiency.

Any material having the physical properties necessary for a radio wave absorber in terms of conductivity loss, dielectric loss, and the like may be used as a substrate material for the above described radio wave absorber or the radio wave absorber unit 1. A conventional urethane absorber or the like produced by cutting and having a pyramid shaped tip end may be ground to have 'R' in the above range.

However, polypropylene-based conductive expanded beads are desirably used as a substrate material in terms of the production efficiency, strength, and heat resistance. A method of manufacturing a polypropylene-based conductive expanded material disclosed by Japanese Patent Laid-Open Publication No. Hei 7-300536 is particularly suitable when an expanded material with a complex shape and a high expansion ratio is produced. By this method, an expanded material with a low resistivity that is suitable for a radio wave absorber can be utilized. Since the expanded material provided by this method has a closed cell structure, and wetting of the polypropylene structure does not occur, a radio wave absorber having high humidity resistance can be achieved.

Polypropylene has a higher softening point than that of polystyrene or polyethylene, and therefore a radio wave absorber having high heat resistance results. Furthermore, polypropylene is flexible and resilient, and allows for a thin tapered tip end which is not readily chipped, thereby improving the production efficiency and the impact resistance.

In a radio wave absorber unit 1 having two or more pyramid or wedge shaped molded bodies 2, and a base 3 supporting the bodies, and integrally formed from polypropylene-based conductive expanded beads, the pyramid or wedge shaped molded body 2 preferably has a tip end in which one side is 15 mm or less in length.

Figure 5:
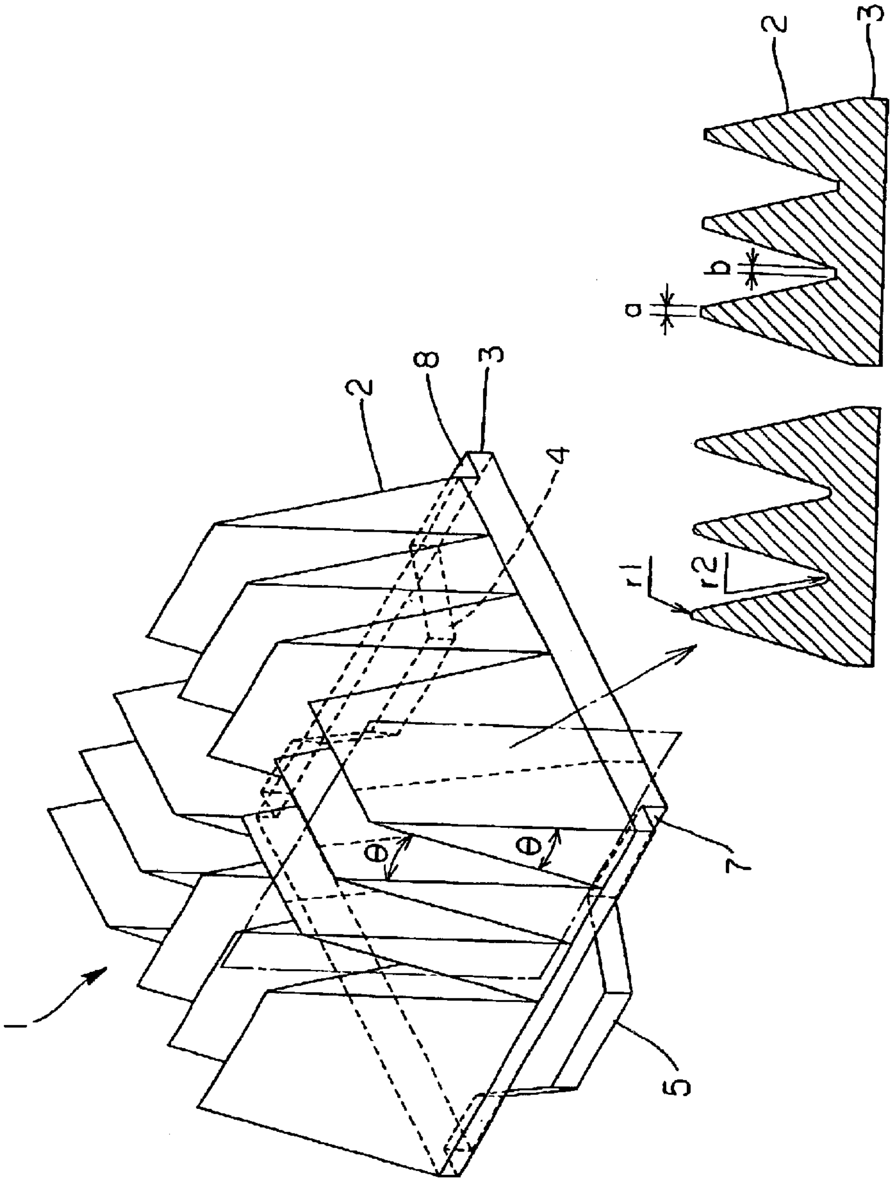
FIG. 5 is a view of a radio wave absorber unit according to still another embodiment of the invention.

Here, when the tip end is in a planar shape as shown in FIG. 2 at (A), the length 'a' of one side of the tip end refers to the length of one side of the plane. In the pyramid shape, the plane at the tip end is generally a regular square, but in the wedge shape shown in FIG. 5, the plane at the tip end is an oblong. In this case, as shown in FIG. 5, 'a' refers to the length of a shorter side. More specifically, the length of a shorter side of the plane at the tip end must be 15 mm or less and this is an essential requirement according to the invention.

As shown in FIG. 2 at (B), when a member inclined at a different angle is connected to the tip end, and the area of the tip end is reduced, the length of one end of a plane produced by removing the inclined part is 'a' (the lower side of the trapezoid at the tip end in FIG. 2 at (B)).

When the tip end is chamfered as shown in FIG. 2 at (C), the length of a side before the chamfering corresponds to 'a'.

Meanwhile, as shown in FIG. 2 at (D), when the tip end is rounded and sharpened, the length of one side of the plane that would be produced by removing the curved part corresponds to 'a'.

As described above, using the polypropylene-based conductive expanded beads as the substrate material, the radio wave absorber unit 1 having a complex shape according to the invention can be integrally formed with high production efficiency. Since polypropylene is flexible and resilient, the obtained radio wave absorber has high impact resistance, and therefore damages resulting from chipping can be reduced. Therefore, the tip end of the pyramid shape may be a plane as an alternative to a curved surface.

The length of one side of the plane at the tip end of the pyramid shape is 15 mm or less, so that a good radio wave absorption characteristic results. When the length of one side of the plane at the tip end is 10 mm or less, the radio wave absorption characteristic is even more greatly improved.

The length of the trough between adjacent pyramid or wedge shaped molded bodies 2, in the radio wave absorber unit at the time, is desirably 15 mm or less. Here, the length (distance) of one end of the trough refers to the length 'b' of one side of the trough between pyramid shapes in FIG. 4 or wedge shapes in FIG. 5. The length can be obtained in the manner described in conjunction with FIG. 2, in other words, similarly to the length of one side of the tip end.

If the length of one side of the trough between pyramid shapes is 15 mm or less, an improved scattering effect results and a good radio wave absorption characteristic can be provided. When the length of one side of the trough is 10 mm or less, the radio wave absorption characteristic is even more greatly improved. Specifying a lower limit is not necessary, while in the radio wave absorber unit made of a polypropylene-based conductive expanded material as described above, the length is desirably at least 2 mm for convenience of manufacturing.

Figure 6:
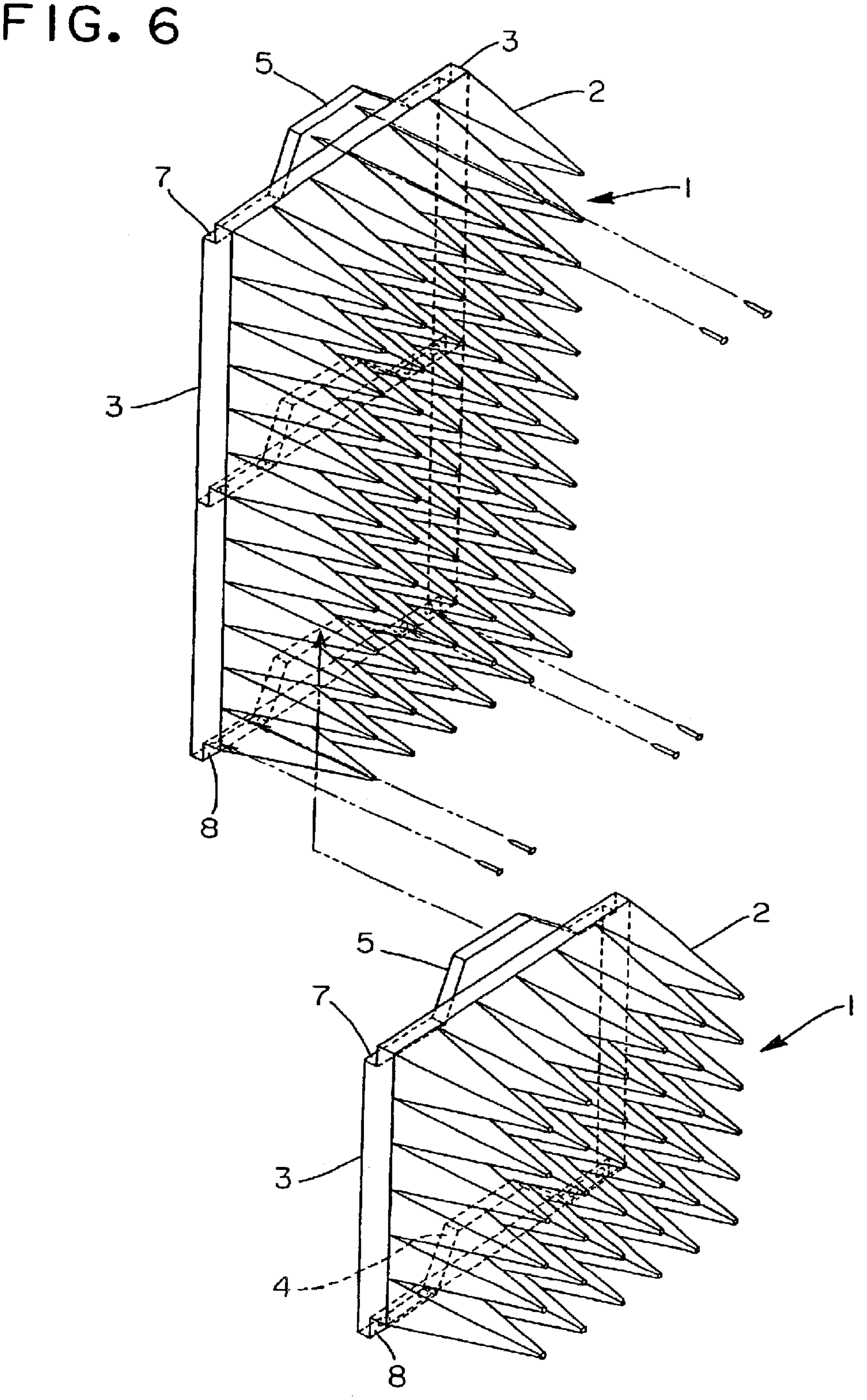
FIG. 6 is a view of a radio wave absorber unit according to still another embodiment of the invention.

In the radio wave absorber unit 1 according to the invention, the base 3 is provided with raised and recessed portions 5 and 4 to be fitted with each other in one direction, the raised portions 5 and recessed portions 4 of these different units 1 may be then fitted to each other, thereby allowing a plurality of units 1 to be connected (see FIG. 6). In this case, the molded bodies are coupled with each other and each mechanically secured, in other words, they can surely be secured without an adhesive, which significantly improves the workability.

As shown in FIGS. 3 to 6, steps 7 and 8 are formed at opposing side surfaces of the base 3. The step 7 faces downward, while the step 8 faces upward. As shown in FIG. 6, when adjacent units 1 are coupled, the step 7 of one unit 1 is placed on the step 8 of the other unit adjacent thereto, and the thickness of the base 3 at this position is consistent with that of the remaining part.

The polypropylene-based conductive expanded beads for the substrate material are particularly useful, as a complex shape can be integrally molded. The polypropylene-based conductive expanded material is tough and therefore damages to the fitting during working or mechanical fixing can be more reduced.

Figure 7:
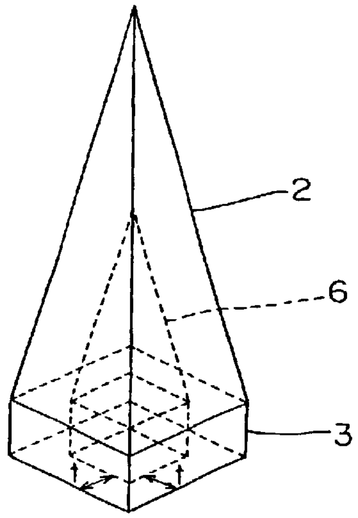
FIG. 7 is a view of a radio wave absorber according to another embodiment of the invention.

In the radio wave absorber and the radio wave absorber unit 1, a pyramid shaped molded body may have a hollow structure 6 if required (see FIG. 7). Radio waves in the microwave band, in particular, are attenuated before being propagated to the absorber inside 6, and therefore the absorber's performance is not reduced by the presence of such a hollow structure inside. In addition, when the hollow structure is formed inside, the thickness of the material may be reduced, thereby reducing deformation by shrinkage of the material. Utilizing a hollow structure can also reduce the weight. In this way, when the hollow structure 6 is formed, the thickness should appropriately be set depending on the performance requirement for, and the volume resistivity of, the material.

For a radio wave absorber used in the microwave band (3 G to 300 GHz), a material with relatively low resistance is suitable. The volume resistivity of the material is preferably in the range from $10^2$ Ω·cm to $10^5$ Ω·cm, and more preferably from $10^2$ Ω·cm to $10^3$ Ω·cm. When the volume resistivity is more than $10^5$ Ω·cm, a sufficient radio wave absorption characteristic is not obtained. Meanwhile, when the volume resistivity is less than $10^2$ Ω·cm, there is too much reflection and both molding and foaming processes are impaired.

The expansion ratio is suitably in such a range that the volume density is in the range from 0.02 g/cm$^3$ to 0.1 g/cm$^3$. As the volume density increases, weight also increases, as does the material cost. Accordingly, the volume density is desirably 0.1 g/cm$^3$ or less. On the other hand, when the density is less than 0.02 g/cm$^3$, the geometry cannot be maintained, making molding processes difficult to carry out.

When conductive expanded beads are used as the substrate material, the beads desirably have a particle size of at most 10 mm, when considering how well they can be charged into the tapered tip ends. The particle size of the conductive expanded beads is at least 2 mm in order to restrain the molded body from shrinking. The expanded bead in a cylindrical shape that is generally used desirably has a size in the range from 2 mm to 10 mm in diameter. Furthermore, if required, for example when the tip end angle of the pyramid must be even smaller, charging the tip ends can be improved by employing two or more kinds of expanded beads having different particle size distribution and/or specific gravity may be used. Here, in the cylindrical expanded beads, the particle size distribution refers to the size distribution in diameter of the cylindrical shape.

EXAMPLES

Experiment 1

Now, products according to examples of the invention will be described in detail.

Expanded beads made of a polypropylene-ethylene copolymer, including carbon black at a compounding ratio of 14 wt % to 16 wt %, and having a volume density of 0.037 g/cm$^3$ to 0.040 g/cm$^3$, with a grain size of 4 mm to 6 mm, were charged into a die, then heated by vapor at 3 kg/cm$^2$ G to 4 kg/cm$^2$ G before being expanded or foamed and fused in the die.

Figure 3:
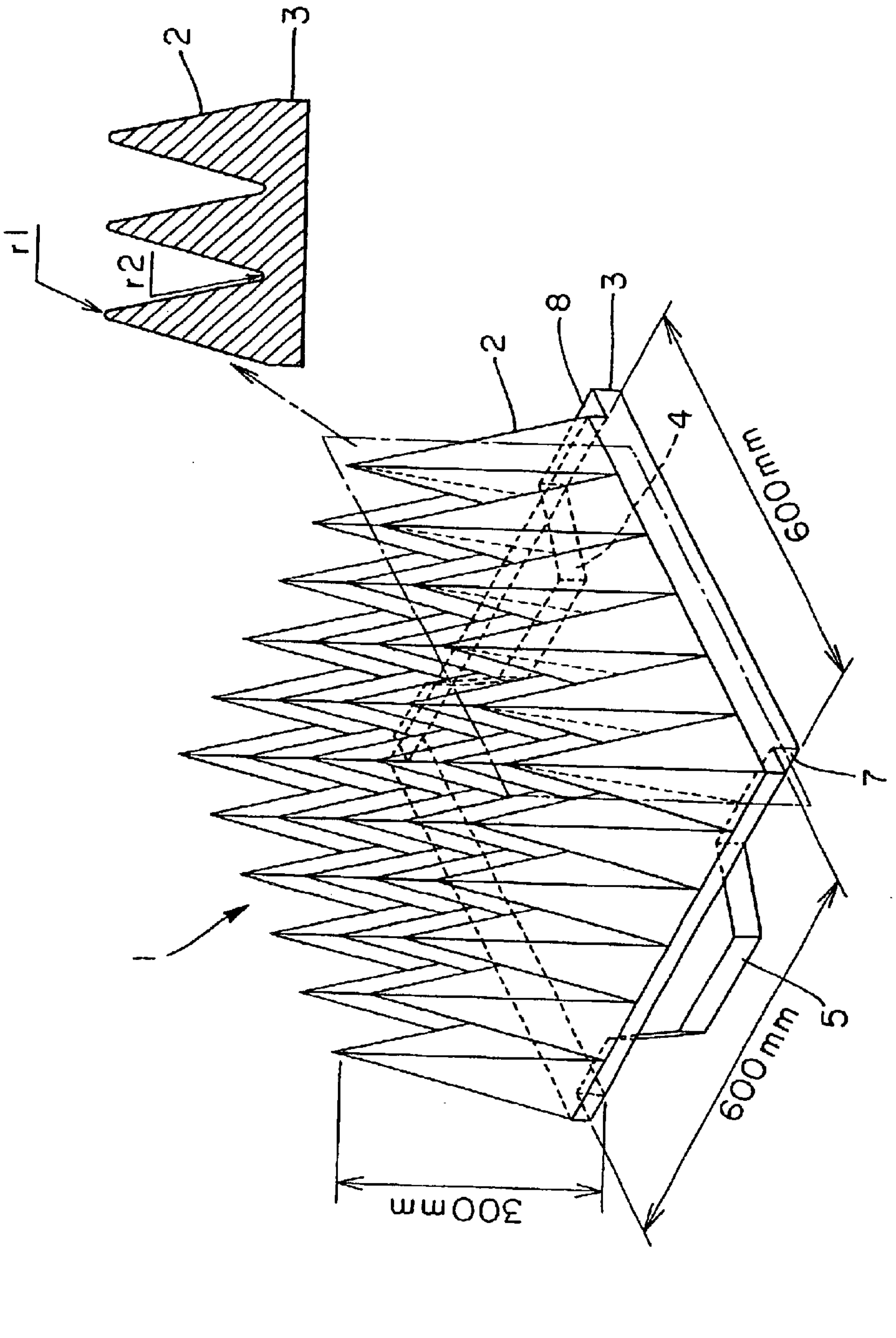
FIG. 3 is a view of a radio wave absorber unit according to one embodiment of the invention.

The fused substance was taken from the die and allowed to dry for 24 hours at 60° C. A pyramid expanded molded body 2 having a volume density of 0.045 g/cm$^3$, and a volume resistivity of 8×$10^2$ Ω·cm to 1.2×$10^3$ Ω·cm was obtained. The shape of the molded body 2 is shown in FIG. 3 and the molding result and the radio wave absorption measurement result with the tip end R (r1) in different sizes are given in Table 1. The trough R (r2) in this case was 7.5 mm.

TABLE 1

| | tip end/trough angle: θ | tip end/size: r1 (mm) | Trough size: r2 (mm) | tip end moldability | radio wave absorption characteristic (dB) 1 GHz | 3 GHz | 10 GHz | 30 GHz | 50 GHz |
|---|---|---|---|---|---|---|---|---|---|
| Example | | | | | | | | | |
| 1 | 20 | 0.5 | 7.5 | Δ | −30 | −40 | −45 | −50 | −50 |
| 2 | 20 | 2 | 7.5 | ○ | −30 | −40 | −45 | −50 | −50 |
| 3 | 20 | 5 | 7.5 | ○ | −30 | −40 | −45 | −50 | −50 |
| 4 | 20 | 7.5 | 7.5 | ○ | −30 | −40 | −45 | −45 | −45 |
| Comparative Example | | | | | | | | | |
| 1 | 20 | 0.3 | 2 | X | — | — | — | — | — |
| 2 | 20 | 10 | 5 | ○ | −30 | −35 | −35 | −35 | −35 |

Criteria for evaluating tip end moldability
○ In all the pyramids, no chipping is observed at the tip ends, and beads are smoothly fused with each other and formed into a prescribed shape.
Δ No chipping is observed at the tip ends, but beads were partly agglomerate and not sufficiently fused with each other.
X There is a pyramid(s) with chipping at the tip end.

As can be seen from the result given in Table 1, in Examples 1 to 4 where r1 was in the range from 0.5 mm to 7.5 mm, good results were obtained for both the moldability of the pyramid tip end and the radio wave absorption characteristic. The results were particularly good for both of them where r1 was in the range from 2 mm to 5 mm. In Comparative example 1 where r1 was 0.3 mm (smaller than Examples 1 to 4), the moldability was degraded. In Comparative example 2 where r1 was larger than Examples 1 to 4, a sufficient radio wave absorption characteristic was not obtained.

Furthermore, in Example 1, some of the pyramids were not sufficiently charged with beads, giving rise to a problem with moldability. When beads having a small grain size of 2 mm to 3 mm was added and mixed in a ratio of 50 wt %, and molding was carried out, sufficient charging was achieved, with the good moldability at the tip end.

Experiment 2

Measurement results where the tip end R (r1) was 5 mm, and the trough R (r2) was varied are given in Table 2. It was found that as r2 became smaller, the radio wave absorption characteristic had a tendency to improve. As can be seen from Table 2, it was found that r2 was preferably 7.5 mm or less, and more preferably 5 mm or less.

TABLE 2

| | tip end/trough angle θ | tip end size: r1 (mm) | trough size: r2 (mm) | radio wave absorption characteristic (dB) 1 GHz | 3 GHz | 10 GHz | 30 GHz | 50 GHz |
|---|---|---|---|---|---|---|---|---|
| Example | | | | | | | | |
| 5 | 20 | 5 | 5 | −30 | −40 | −45 | −50 | −50 |
| 6 | 20 | 5 | 7.5 | −30 | −40 | −45 | −45 | −45 |
| 7 | 20 | 5 | 10 | −30 | −40 | −40 | −40 | −40 |

Experiment 3

Figure 4:
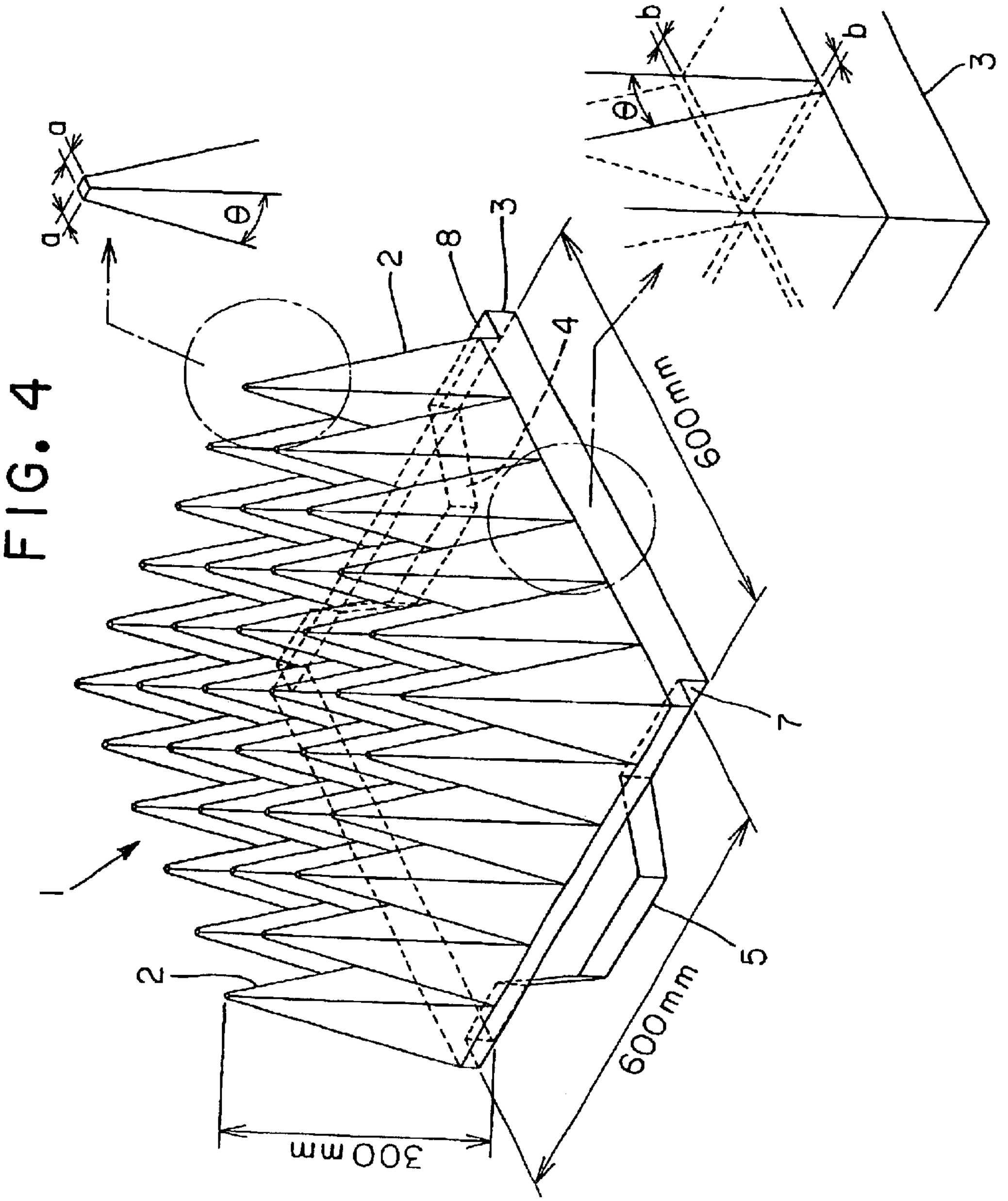
FIG. 4 is a view of a radio wave absorber unit according to another embodiment of the invention.

Measurement results where the pyramid tip end and trough were planar as shown in FIG. 4, and the length 'a' of one side of the plane at the tip end was varied, are given in Table 3. Here, the distance 'b' of one side of the trough between adjacent pyramids was 10 mm. When 'a' was 15 mm or less, a good characteristic was obtained, though a particularly good result was given when 'a' was 10 mm or less. In Comparative example 3 where the tip end size 'a' was 20 mm, insufficient performance resulted. Consequently, the tip end size must not be more than 15 mm.

TABLE 3

| | tip end/trough angle: θ | tip end size: a (mm) | trough size: b (mm) | radio wave absorption characteristic (dB) 1 GHz | 3 GHz | 10 GHz | 30 GHz | 50 GHz |
|---|---|---|---|---|---|---|---|---|
| Example | | | | | | | | |
| 8 | 20 | 5 | 10 | −30 | −40 | −45 | −50 | −50 |
| 9 | 20 | 10 | 10 | −30 | −40 | −45 | −50 | −50 |
| 10 | 20 | 15 | 10 | −30 | −40 | −45 | −45 | −45 |
| Comparative Example | | | | | | | | |
| 3 | 20 | 20 | 10 | −30 | −35 | −35 | −35 | −35 |

The above examples are in relation to the pyramid shapes, while the same effects were observed for wedge shapes as shown in FIG. 5. FIG. 5 shows θ, r1, r2, 'a' and 'b' in this case.

Experiment 4

An example of how to attach the radio wave absorber units of FIGS. 3 and 4 is shown in FIG. 6. Each unit 1 is secured with screws or the like, and the raised portions 5 and the recessed portions 4 respectively of different units 1 are fitted and connected to each other. In this way, the units can readily be attached without an adhesive. The screws used for securing are covered with adjacent connected units and are not exposed at the surface of the radio wave absorbers.

Note that the fitting manner in FIGS. 3 and 4 is shown simply by way of illustration, and similar methods of fitting, other than in this example, may be employed.

Experiment 5

Each pyramid had the same shape as that of the molded body in Experiment 2 except that the inside was hollow as shown in FIG. 7. The radio wave absorption characteristic was measured for different thickness. The measurement results for the unit weight and the radio wave absorption characteristic for various thicknesses are given in Table 4.

As can be seen from Table 4, for a hollow structure, the radio wave absorption characteristic is hardly degraded as far as the thickness is 20 mm. When the structure is made hollow inside and with a thickness of 20 mm, the unit weight is reduced almost by 30%, in other words, the material cost can be reduced by that amount.

TABLE 4

| | pyramid structure | Thickness: t (mm) | unit weight (g) | radio wave absorption characteristic (dB) 1 GHz | 3 GHz | 10 GHz | 30 GHz | 50 GHz |
|---|---|---|---|---|---|---|---|---|
| Example | | | | | | | | |
| 11 | filled | — | 2.160 | −30 | −40 | −45 | −50 | −50 |
| 2 | hollow | 20 | 1,580 | −25 | −40 | −45 | −50 | −50 |

Experiment 6

Each pyramid had the same shape as that of the molded body in Experiment 2 except that the volume density (expansion ratio) was varied, and the volume resistivity and the radio wave absorption characteristic were measured. The measurement results are given in Table 5. It was found, based on the measured radio wave absorption characteristic, that the volume resistivity of the molded body was preferably in the range from $10^2$ Ω·cm to $10^5$ Ω·cm, and more preferably from $10^2$ Ω·cm to $10^4$ Ω·cm. Also, based on the moldability and the radio wave absorption characteristic, the volume density of the molded body is desirably in the range from 0.02 g/cm$^3$ to 0.1 g/cm$^3$.

2. A radio wave absorber unit, comprising:

at least two molded bodies each being at least one of a pyramid shaped molded body and a wedge shaped molded body, a radius at a tip end thereof being in the range from 0.5 mm to 7.5 mm, and an apex angle thereof being in the range of 15° to 25° ; and a base supporting the molded bodies, a radius at a trough between adjacent molded bodies being 7.5 mm or less.

3. A radio wave absorber according to claim 1, wherein a polypropylene-based conductive expanded bead is used as a substrate material.

TABLE 5

| | volume density (g/cm$^3$) | expansion ratio (X) | state of molded tip end | volume specific resistance (Ω · cm) | radio wave absorption characteristic (dB) 1 GHz | 3 GHz | 10 GHz | 30 GHz | 50 GHz |
|---|---|---|---|---|---|---|---|---|---|
| Example | | | | | | | | | |
| 14 | 0.045 | 20 | ○ | $1.0 \times 10^3$ | −30 | −40 | −45 | −50 | −50 |
| 15 | 0.100 | 9 | ○ | $2.0 \times 10^2$ | −30 | −40 | −45 | −50 | −50 |
| 16 | 0.020 | 45 | ○ | $6.0 \times 10^4$ | −25 | −35 | −40 | −45 | −45 |
| 17 | 0.120 | 7.5 | ○ | $7.0 \times 10^1$ | −30 | −40 | −40 | −40 | −40 |

Criteria for evaluating tip end moldability

○ In all the pyramids, no chipping is observed at the tip ends, and beads are smoothly fused with each other and formed into a prescribed shape.

Δ No chipping is observed at the tip ends, but beads were partly agglomerate and not sufficiently fused with each other.

X There is a pyramid(s) with chipping at the tip end.

Figure 8:
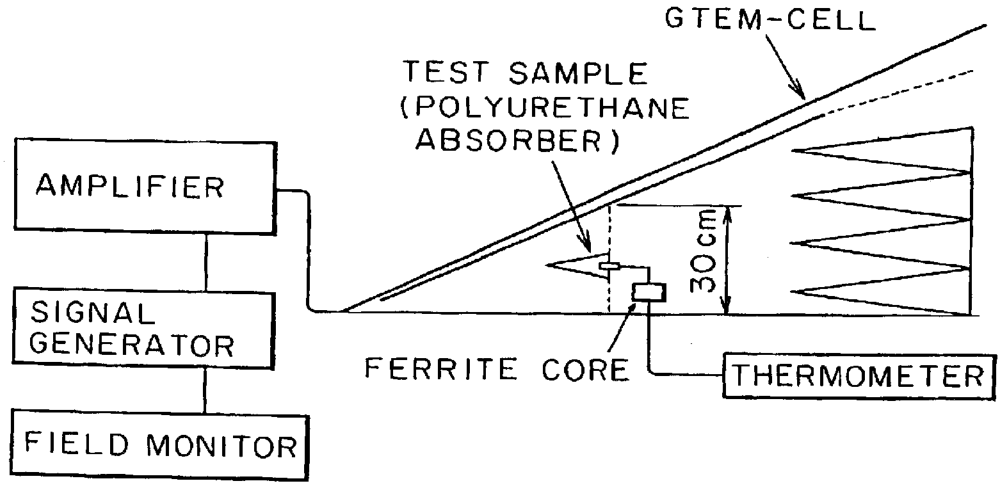
FIG. 8 is a view for use in illustration of a heating test unit with a GTEM cell.
Figure 9:
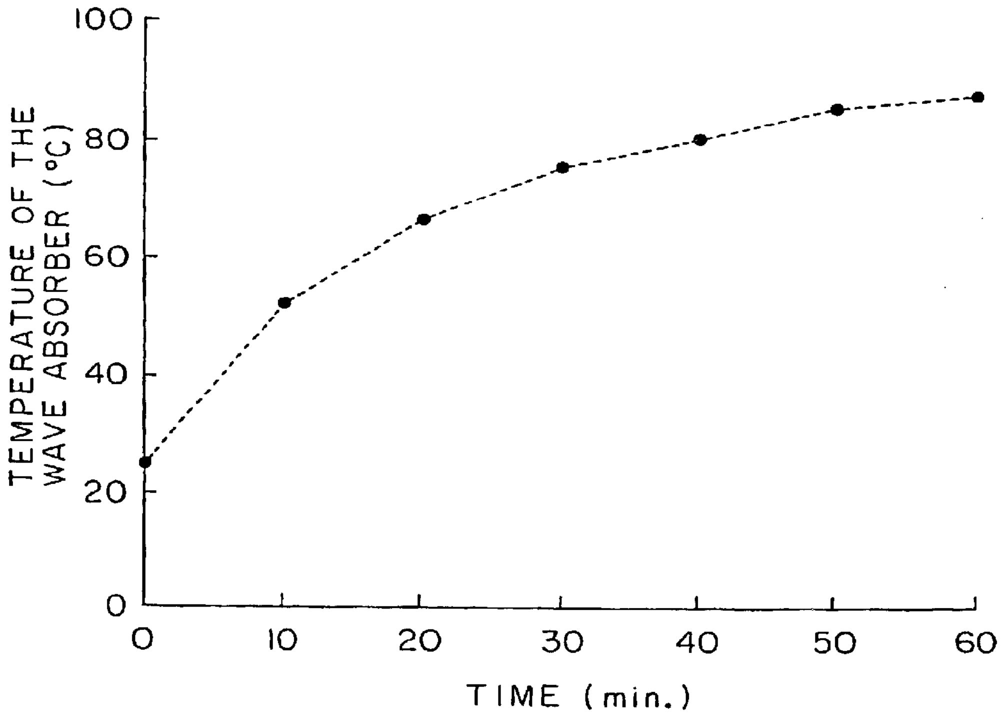
FIG. 9 is a graph showing the result of a heating test for a urethane foam absorber.

For testing heating by radio wave absorption, temperature rise in a urethane absorber 1 which results from the application of an electric field using from GTEM (Gigahertz Transverse Electromagnetic) cells as shown in FIG. 8 was measured. The measurement results are given in FIG. 9. Here the temperature was raised to almost 90° C. after about 60 minutes.

Figure 10:
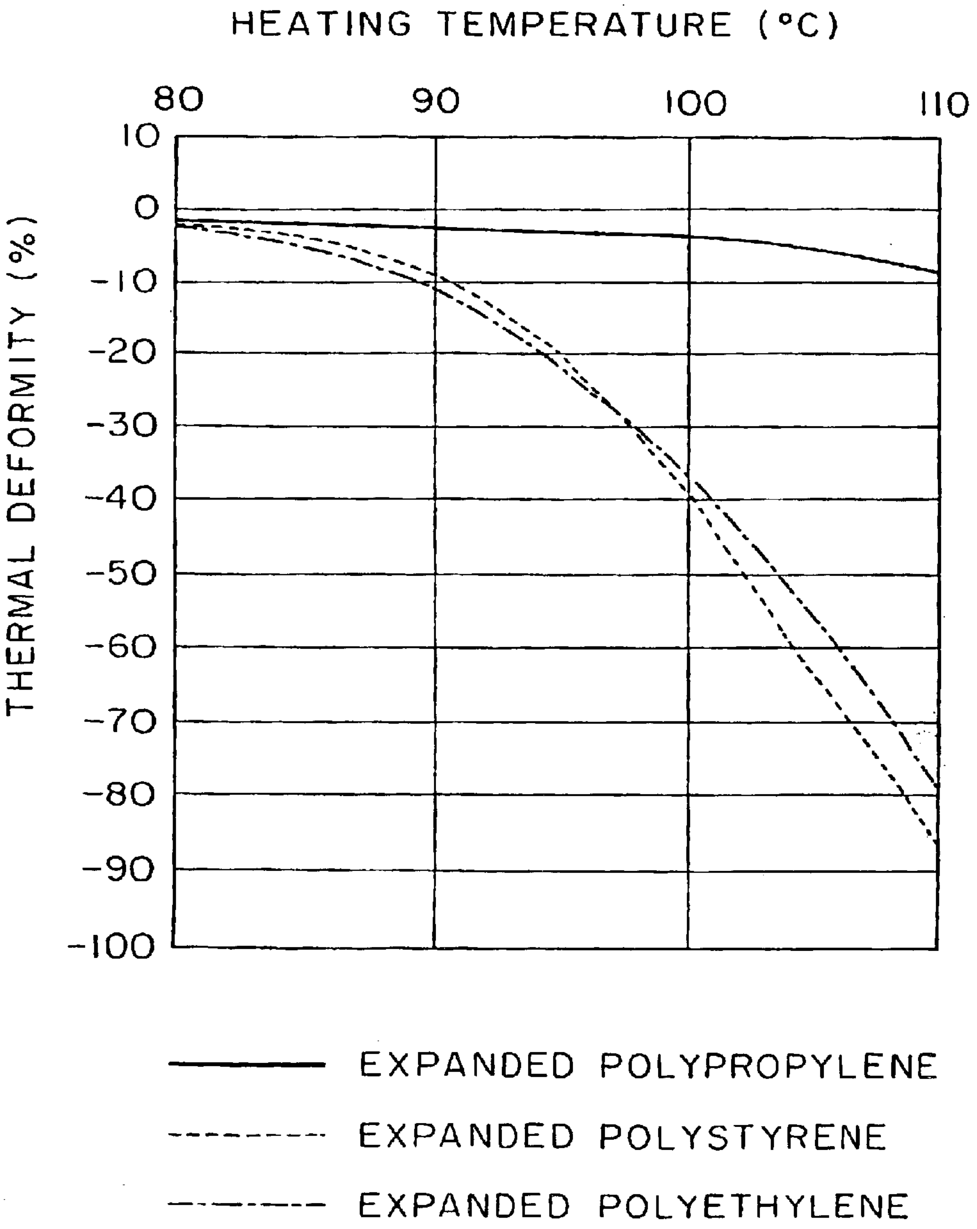
FIG. 10 is a graph showing the thermal deformation characteristic of various foams.

For an expanded polypropylene, an expanded polystyrene, and an expanded polyethylene each having a volume density of 0.04 g/cm$^3$, the thermal deformation ratio was measured by a test method according to JIS K6767. The measurement results are given in FIG. 10. At 90° C. or higher, the expanded polystyrene and the expanded polyethylene largely deformed, while the expanded polypropylene deformed only slightly. More specifically, a radio wave absorber using an expanded polyethylene as a substrate material should have higher heat resistance.

As in the foregoing, and in accordance with the invention, a radio wave absorber or a radio wave absorber unit having a good radio wave absorption characteristic and high impact resistance can be achieved. Polypropylene-based conductive expanded beads are used for integral molding, so that the radio wave absorption characteristic and the impact resistance can be improved, and the production efficiency can also be significantly improved.

What is claimed is:

1. A radio wave absorber comprising one of a pyramid shaped molded body and a wedge shaped molded body, a radius at a tip end thereof being in the range from 0.5 mm to 7.5 mm, and an apex angle thereof being in the range of 15° to 25°.

4. A radio wave absorber unit, comprising:

at least two molded bodies being at least one of a pyramid shaped molded body and a wedge shaped molded body; and a base supporting the molded bodies, said radio wave absorber unit being integrally formed of a polypropylene-based conductive expanded bead, a length of one side of a tip end of said molded body being 15 mm or less, and an apex angle thereof being in the range of 15° to 25°.

5. A radio wave absorber unit according to claim 2, wherein the base has a recessed portion and a raised portion that can be fitted to another radio wave absorber unit.

6. A radio wave absorber according to claim 3, wherein the polypropylene-based conductive expanded bead has a size in the range from 2 mm to 10 mm.

7. A radio wave absorber according to claim 3, wherein the polypropylene-based conductive expanded bead comprises at least two kinds of expanded beads having different particle size distributions.

8. A radio wave absorber according to claim 1, wherein the molded body has a hollow structure.

9. A radio wave absorber unit according to claim 4, wherein the base has a recessed portion and a raised portion that can be fitted to another radio wave absorber unit.

10. A radio wave absorber unit according to claim 2, wherein the molded body has a hollow structure.

* * * * *